United States Patent
Shimizu et al.

(10) Patent No.: US 9,548,140 B2
(45) Date of Patent: Jan. 17, 2017

(54) NUCLEAR REACTOR VESSEL SUPPORT STRUCTURE AND CONSTRUCTION METHOD OF NUCLEAR REACTOR VESSEL SUPPORT STRUCTURE

(75) Inventors: Hiroshi Shimizu, Tokyo (JP); Ryo Fujimoto, Tokyo (JP); Kentaro Mori, Tokyo (JP); Hiromu Okamoto, Tokyo (JP); Hisashi Sekimoto, Hiroshima (JP); Hiroyuki Iseki, Kakogawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 825 days.

(21) Appl. No.: 13/992,999

(22) PCT Filed: Dec. 6, 2011

(86) PCT No.: PCT/JP2011/078176
§ 371 (c)(1),
(2), (4) Date: Jun. 10, 2013

(87) PCT Pub. No.: WO2012/081449
PCT Pub. Date: Jun. 21, 2012

(65) Prior Publication Data
US 2013/0272485 A1    Oct. 17, 2013

(30) Foreign Application Priority Data
Dec. 13, 2010    (JP) .................... 2010-277203

(51) Int. Cl.
*G21C 13/00* (2006.01)
*G21C 13/024* (2006.01)
(Continued)

(52) U.S. Cl.
CPC ............. *G21C 13/024* (2013.01); *E04B 1/16* (2013.01); *F22B 37/248* (2013.01); *Y02E 30/40* (2013.01)

(58) Field of Classification Search
CPC ....... G21C 13/00; G21C 13/02; G21C 13/024; G21C 13/08; G21C 13/087; G21C 13/093; E04B 1/16; F22B 37/248
(Continued)

(56) References Cited

U.S. PATENT DOCUMENTS 2,890,009 A * 6/1959 Chapellier ............... F16M 5/00
248/146
3,129,836 A * 4/1964 Frevel ................. B01J 19/0053
206/521

(Continued)

FOREIGN PATENT DOCUMENTS

JP    51-145499 U    11/1976
JP    56-057991 A    5/1981
(Continued)

OTHER PUBLICATIONS

International Search Report dated Jan. 24, 2012, issued in corresponding application PCT/JP2011/078176, w/ English translation (4 pages).

(Continued)

*Primary Examiner* — Jack W Keith
*Assistant Examiner* — Sharon M Davis
(74) *Attorney, Agent, or Firm* — Westerman, Hattori, Daniels & Adrian, LLP

(57) ABSTRACT

A nuclear reactor vessel structure includes an inner peripheral tube-shaped steel plate, an outer peripheral tube-shaped steel plate, and an intermediate tube-shaped steel plate disposed between the inner and outer peripheral tube-shaped steel plates, and is configured to support a nuclear reactor vessel on the inner peripheral side of a tube-shaped structure with concrete placed between the steel plates. The nuclear reactor vessel structure includes a support having a tube-shaped plate disposed on the inner peripheral side of the (Continued)

intermediate tube-shaped steel plate, and an annular plate which protrudes to the inner peripheral side of the tube-shaped plate and to which a connection section is affixed. The support is affixed to the concrete, which is placed between the inner peripheral and the intermediate tube-shaped steel plates, by first bar members, and the support is also affixed to the inner peripheral tube-shaped steel plate by second bar members.

11 Claims, 8 Drawing Sheets

(51) Int. Cl.
  *F22B 37/24* (2006.01)
  *E04B 1/16* (2006.01)
(58) Field of Classification Search
  USPC .............. 376/285, 293, 294, 295, 302, 461;
  248/146; 403/168
  See application file for complete search history.

(56) References Cited

U.S. PATENT DOCUMENTS

| | | | | |
|---|---|---|---|---|
| 3,414,472 A | * | 12/1968 | Chave | G21C 9/012 376/283 |
| 4,209,889 A | * | 7/1980 | Silva | B63B 59/00 29/432 |
| 4,458,458 A | * | 7/1984 | Orii | B65D 90/043 220/694 |
| 4,508,677 A | * | 4/1985 | Craig | G21C 1/322 376/171 |
| 5,102,612 A | * | 4/1992 | McDonald | G21C 13/028 376/203 |
| 5,638,652 A | * | 6/1997 | Shinoda | E04B 1/161 52/250 |
| 5,673,528 A | * | 10/1997 | Danisch | G21C 13/00 376/293 |
| 7,497,054 B2 | * | 3/2009 | Takeuchi | E04B 1/2403 403/403 |
| 2008/0198960 A1 | * | 8/2008 | Keegan | G21C 11/08 376/289 |

FOREIGN PATENT DOCUMENTS

| | | |
|---|---|---|
| JP | 58-014088 A | 1/1983 |
| JP | 58-103694 A | 6/1983 |
| JP | 58-196491 A | 11/1983 |
| JP | 60-219587 A | 11/1985 |
| JP | 61-026197 U | 2/1986 |
| JP | 04-001492 U | 1/1992 |
| JP | 2000-346973 A | 12/2000 |
| JP | 2007-085814 A | 4/2007 |
| JP | 2008-275368 A | 11/2008 |

OTHER PUBLICATIONS

Written Opinion dated Jan. 24, 2012, issued in corresponding application PCT/JP2011/078176, w/ English translation (9 pages).

* cited by examiner

US 9,548,140 B2

NUCLEAR REACTOR VESSEL SUPPORT STRUCTURE AND CONSTRUCTION METHOD OF NUCLEAR REACTOR VESSEL SUPPORT STRUCTURE

TECHNICAL FIELD

The present invention relates to a nuclear reactor vessel support structure for supporting a nuclear reactor vessel in an annular structure having the nuclear reactor vessel housed therein and a construction method of the nuclear reactor vessel support structure.

Priority is claimed on Japanese Patent Application No. 2010-277203 filed on Dec. 13, 2010, the contents of which is incorporated herein by reference.

BACKGROUND ART

Conventionally, a nuclear reactor vessel is housed in a nuclear reactor building in a state in which the nuclear reactor vessel is supported by a structure of a nuclear reactor building (for example, see Patent Literature 1).

For example, a member (a support) affixed to the structure is mounted in a nuclear reactor vessel and the support is affixed to the structure so as to be supported by the structure.

In addition, the support needs to be securely affixed to the structure and integrally formed with the structure so that the support is not deformed due to a vertical load or a horizontal load during an earthquake. Therefore, the support is affixed to the structure by welding when affixing to the structure.

CITATION LIST

Patent Literature

[Patent Literature 1] Japanese Unexamined Patent Application, First Publication No. 2007-85814

SUMMARY OF THE INVENTION

Problems to be Solved by the Invention

However, when the support is welded to the support, thermal distortion (deformation) occurs at the bonded portion due to the welding. As a result, there is a problem in that the nuclear reactor vessel may not be installed in the structure with high precision.

In consideration of the above-mentioned circumstances, it is an object of the present invention to provide a nuclear reactor vessel support structure capable of preventing a support and a structure (a tube-shaped structure) from being deformed at a bonded portion thereof.

Means for Solving the Problems

In order to achieve the foregoing object, according to an aspect of the present invention, a nuclear reactor vessel support structure includes: an inner peripheral tube-shaped steel plate, an outer peripheral tube-shaped steel plate, and an intermediate tube-shaped steel plate disposed between the inner peripheral and outer peripheral tube-shaped steel plates. Further, the nuclear reactor vessel support structure is a structure which supports a nuclear reactor vessel on the inner peripheral side of a tube-shaped structure formed by pouring concrete between the inner peripheral steel plate and the intermediate tube-shaped steel plate and between the intermediate tube-shaped steel plate and the outer peripheral tube-shaped steel plate. The nuclear reactor vessel support structure includes a support which has a tube-shaped plate disposed on the inner peripheral side of the intermediate tube-shaped steel plate, and an annular plate which protrudes to the inner peripheral side of the tube-shaped plate and to which a connection part connected to the nuclear reactor vessel is affixed. Further, the support may be affixed to the concrete placed between the inner peripheral tube-shaped steel plate and the intermediate tube-shaped steel plate by a first bar member extending in a vertical direction and affixed to the inner peripheral tube-shaped steel plate or the intermediate tube-shaped steel plate by a second bar member extending in a radial direction of the tube-shaped structure.

According to another aspect of the present invention, a construction method of the above nuclear reactor vessel support structure includes: a tube-shaped steel plate installing process of installing an inner peripheral tube-shaped steel plate, an outer peripheral tube-shaped steel plate, and an intermediate tube-shaped steel plate; a first concrete pouring process of pouring concrete in a position between the inner peripheral tube-shaped steel plate and the intermediate tube-shaped steel plate and between the outer peripheral tube-shaped steel plate and the intermediate tube-shaped steel plate, to a lower height than a position at which a support, a first bar member and a second bar member are installed; a support installing process of installing the support along with the first bar member and affixing the support to the inner peripheral tube-shaped steel or the intermediate tube-shaped steel plate by the second bar member; and a second concrete pouring process of pouring concrete in a position at which the support, the first bar member, and the second bar member are installed.

According to the aspects of the present invention, the support may be affixed to the concrete placed between the inner peripheral tube-shaped steel plate and the intermediate tube-shaped steel plate by the first bar member extending in a vertical direction and affixed to the inner peripheral tube-shaped steel plate or the intermediate tube-shaped steel plate by the second bar member extending in a radial direction of the tube-shaped structure. Thereby, the support can resist an out-of-plane bending load, that is, a vertical load applied thereto with the first bar member against a load during an earthquake. Further, the support can resist a shearing load, that is, a horizontal load applied thereto with the second bar member. Therefore, the support and the tube-shaped structure can be securely affixed to each other.

The support and the tube-shaped structure can be affixed to each other without welding, and thereby the thermal distortion (deformation) does not occur. As a result, it is possible to prevent the support and the tube-shaped structure from being deformed at the bonded portion thereof.

Further, in the nuclear reactor vessel structure according to the aspects of the present invention, the first bar member may be a foundation bolt of which a lower end side is buried in the concrete placed between the inner peripheral tube-shaped steel plate and the intermediate tube-shaped steel plate and an upper end side is inserted into a through hole formed in the annular plate to affix the annular plate.

According to the foregoing configuration, the annular plate can be affixed to the concrete placed between the inner peripheral tube-shaped steel plate and the intermediate tube-shaped steel plate by the foundation bolt.

Further, in the nuclear reactor vessel support structure according to the aspects of the present invention, the first bar member may be a first stud which is bonded to a lower surface of the annular plate and buried in the concrete placed between the inner peripheral tube-shaped steel plate and the intermediate tube-shaped steel plate.

According to the foregoing configuration, the annular plate can be affixed to the concrete placed between the inner peripheral tube-shaped steel plate and the intermediate tube-shaped steel plate by the first stud. Further, the plurality of first studs may be evenly installed on the lower surface of the annular plate. Therefore, the load applied to the annular plate can be dispersed throughout the concrete placed between the inner peripheral tube-shaped steel plate and the intermediate tube-shaped steel plate through the first stud.

Further, in the nuclear reactor vessel support structure according to the aspects of the present invention, the second bar member has a radial outer end side inserted into the through hole formed in the intermediate tube-shaped steel plate and buried in the concrete placed between the intermediate tube-shaped steel plate and the outer peripheral tube-shaped steel plate. In addition, the second bar member is an anchor bolt which has a radial inner end side inserted into the through hole formed in the tube-shaped plate and affixes the tube-shaped plate. A filler may be filled between the intermediate tube-shaped steel plate and the tube-shaped plate.

According to the foregoing configuration, the tube-shaped plate can be affixed to the intermediate tube-shaped steel plate by the anchor bolt. The filler, for example, a grout material, a shim, and the like, may be filled between the tube-shaped plate and the intermediate tube-shaped steel plate to easily adjust the radial position of the support.

Further, in the nuclear reactor vessel support structure according to the aspects of the present invention, the intermediate tube-shaped steel plate is divided vertically into two portions disposed above and below the tube-shaped plate. In addition, a splice plate is disposed over the tube-shaped plate and the intermediate tube-shaped steel plate. The second bar member may be a bolt which connects the tube-shaped plate with the splice plate and a bolt which joins the divided body to the splice plate.

According to the foregoing configuration, the tube-shaped plate can be affixed to the intermediate tube-shaped steel plate through the splice plate by the bolts.

Further, in the nuclear reactor vessel support structure according to the aspects of the present invention, a shim may be disposed between the splice plate and the tube-shaped plate or the intermediate tube-shaped steel plate to adjust an interval between the splice plate and the tube-shaped plate or the intermediate tube-shaped steel plate.

According to the foregoing configuration, even when the thickness of the tube-shaped plate is different from that of the intermediate tube-shaped steel, the tube-shaped plate can be securely affixed to the intermediate tube-shaped steel plate and the thickness of the shim can be adjusted to easily adjust the radial position of the support.

In the nuclear reactor vessel support structure according to the aspects of the present invention, a second stud buried in the concrete placed between the inner tube-shaped steel plate and the intermediate tube-shaped steel plate may be bonded to the outer peripheral surface of the tube-shaped plate.

According to the foregoing configuration, the tube-shaped plate can be affixed to the concrete between the intermediate tube-shaped steel plate and the outer tube-shaped steel plate by the second stud and can resist the shearing load along with the bolt. In addition, the plurality of second studs is evenly bonded to the outer peripheral surface of the tube-shaped plate. Therefore, the shearing load applied to the tube-shaped plate can be dispersed throughout the concrete between the intermediate tube-shaped steel plate and the outer tube-shaped steel plate.

Further, in the nuclear reactor vessel support structure according to the aspects of the present invention, the support includes a tube-shaped body that protrudes downward from the inner peripheral side of the annular plate and is disposed on the upper portion of the inner peripheral tube-shaped steel plate, and the splice plate is disposed over the tube-shaped body and the inner peripheral tube-shaped steel plate. The second bar member is a bolt which connects a second tube-shaped plate with the splice plate and a bolt which joins the inner peripheral tube-shaped steel plate and the splice plate. The filler may be filled between the tube-shaped plate and the intermediate tube-shaped steel plate.

According to the foregoing configuration, the support can be affixed to the inner peripheral tube-shaped steel plate through the tube-shaped body and the splice plate by the bolts.

Further, in the nuclear reactor vessel support structure according to the aspects of the present invention, the second bar member may be the aforementioned bolt, and an anchor bolt which has the radial outer end side inserted into the through hole formed in the intermediate tube-shaped steel plate and buried in the concrete placed between the intermediate tube-shaped steel plate and the outer peripheral tube-shaped steel plate and the radial inner end side inserted into the through hole formed in the tube-shaped plate to affix the tube-shaped plate.

According to the foregoing configuration, the support can be affixed to the intermediate tube-shaped steel plate by the anchor bolt and can resist the shearing load applied thereto along with the bolt.

Further, in the nuclear reactor vessel support structure according to the aspects of the present invention, a rib protruding downward may be formed on the lower surface of the annular plate.

According to the foregoing configuration, the support can resist the shearing load applied thereto with the rib.

Effects of the Invention

According to the aspects of the present invention, the support is affixed to the concrete placed between the inner peripheral tube-shaped steel plate and the intermediate tube-shaped steel plate by the first bar member extending in a vertical direction and affixed to the inner peripheral tube-shaped steel plate or the intermediate tube-shaped steel plate by the second bar member extending in a radial direction of the tube-shaped structure. Therefore, the support can resist the out-of-plane bending load applied thereto with the first bar member, and the support can resist the shearing load applied thereto with the second bar member. Further, the support can be bonded to the tube-shaped structure without welding. Therefore, it is possible to prevent the thermal distortion (deformation) due to the welding and to prevent the support and the tube-shaped structure from being deformed at the bonded portion thereof.

DESCRIPTION OF EMBODIMENTS

First Embodiment

Hereinafter, a nuclear reactor vessel support structure according to an embodiment of the present invention will be described with reference to FIGS. 1 to 3.

Figure 1:
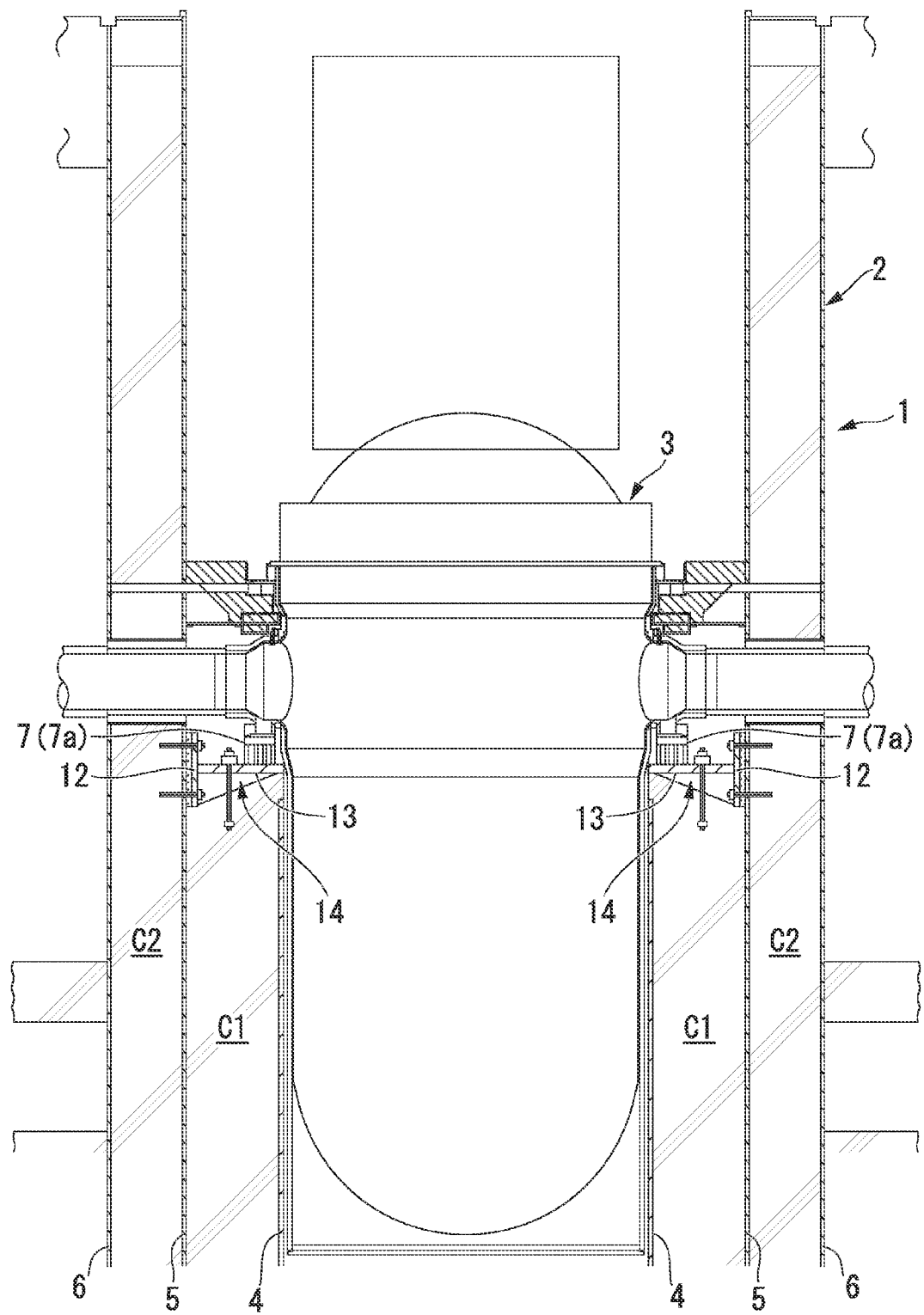
FIG. 1 is a view illustrating an example of a nuclear reactor vessel support structure according to a first embodiment of the present invention.

As shown in FIG. 1, a nuclear reactor vessel support structure 1 according to the present embodiment is configured to support a nuclear reactor vessel 3 at an inner peripheral side of a tube-shaped structure 2 which is a structure of a nuclear reactor building.

The tube-shaped structure 2 includes an inner peripheral tube-shaped steel plate 4 of a cylindrical shape extending in a vertical direction, an outer peripheral tube-shaped steel plate 6, and an intermediate tube-shaped steel plate 5 disposed between the inner and outer peripheral tube-shaped steel plates. Further, an inner peripheral side concrete C1 is placed between the inner peripheral tube-shaped steel plate 4 and the intermediate tube-shaped steel plate 5 and an outer peripheral side concrete C2 is placed between the intermediate tube-shaped steel plate 5 and the outer peripheral tube-shaped steel plate 6.

The inner peripheral tube-shaped steel plate 4 is formed to have a height lower than those of the intermediate tube-shaped steel plate 5 and the outer peripheral tube-shaped steel plate 6.

The nuclear reactor vessel support structure 1 includes a support 14 having a cylindrical tube-shaped plate 12 which is disposed on the inner peripheral side of the intermediate tube-shaped steel plate 5, and a cylindrical annular plate 13 to which a radial support (a connection part) 7 is affixed, which protrudes to the inner peripheral side of the cylindrical tube-shaped plate 12 and is connected to the nuclear reactor vessel 3.

Figure 2:
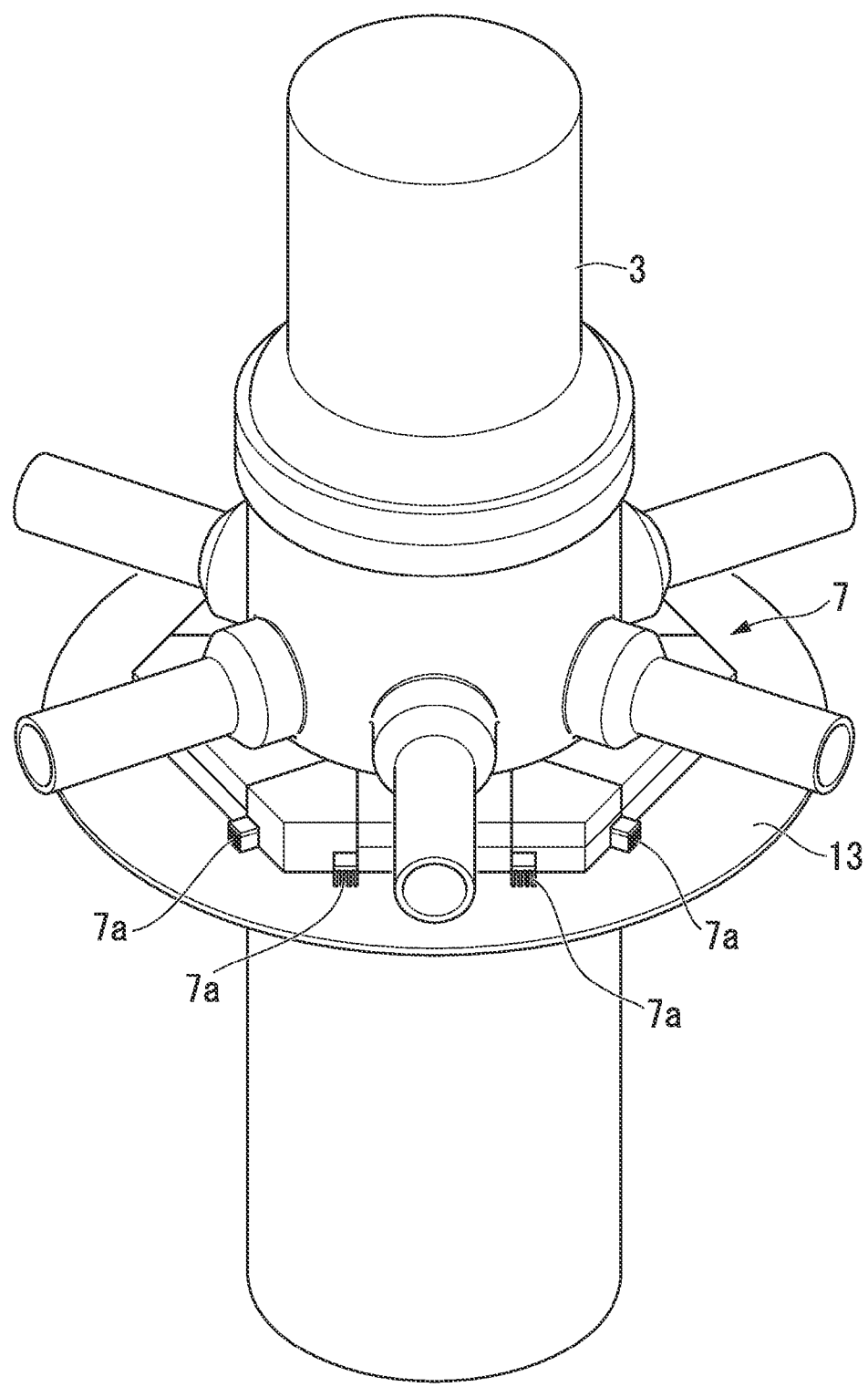
FIG. 2 is a perspective view for describing a nuclear reactor vessel and an annular plate.

As shown in FIG. 2, the radial support 7 includes a plurality of radial support keys 7a which are disposed around the nuclear reactor vessel 3 in a circumferential direction. Further, the plurality of radial support keys 7a are connected with each other and alternately affixed to the nuclear reactor vessel 3 and the annular plate 13.

Figure 3:
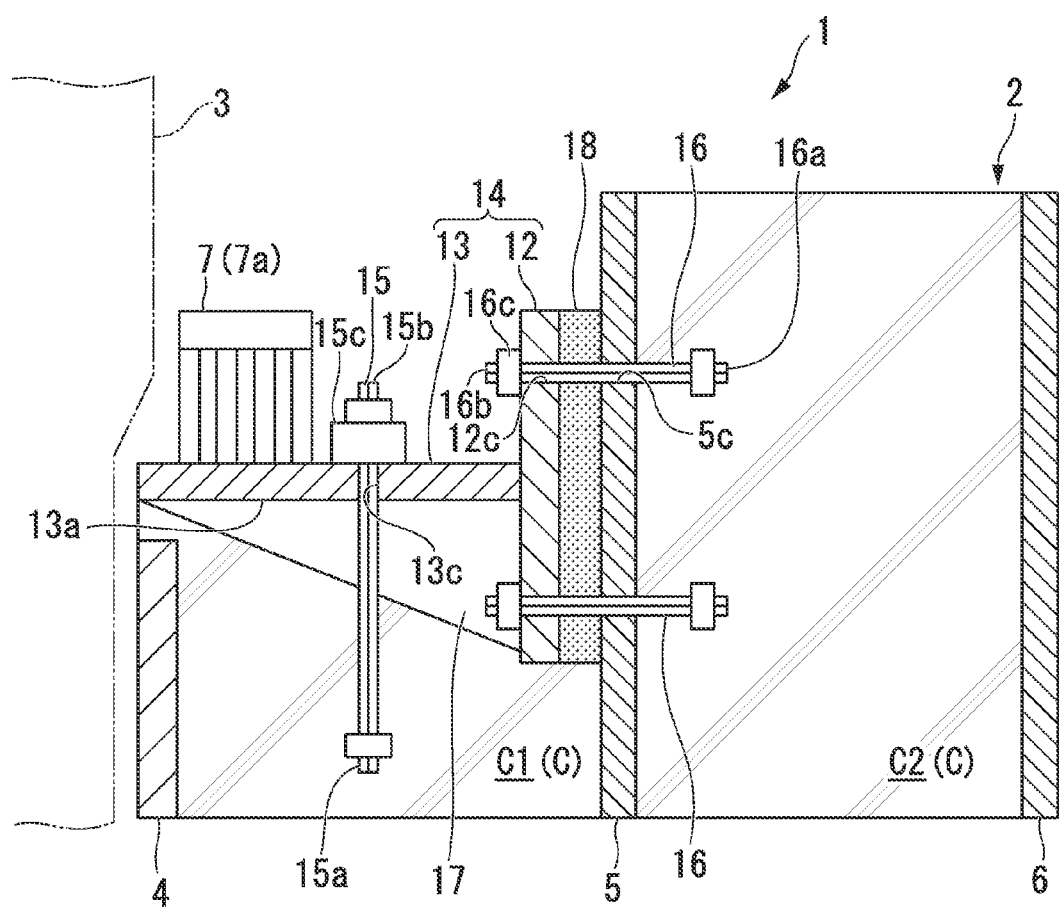
FIG. 3 is a partially enlarged view of FIG. 1.

Further, as shown in FIG. 3, the annular plate 13 of the support 14 is affixed to the inner peripheral side concrete C1 by foundation bolts (first bar members) 15 extending in a vertical direction. The tube-shaped plate 12 of the support 14 is affixed to the intermediate tube-shaped steel plate 5 by anchor bolts (second bar members) 16 extending in a radial direction of the tube-shaped structure 2.

The annular plate 13 is disposed above the inner peripheral tube-shaped steel plate 4 and a lower surface 13a thereof abuts a surface of the inner peripheral side concrete C1.

Further, the annular plate 13 is provided with a plurality of through holes 13c that have the foundation bolts 15 penetrating therethrough in a vertical direction so as to be inserted thereinto and are disposed at a predetermined interval in a circumferential direction.

A plurality of ribs 17 protruding downward are formed on a lower surface 13a of the annular plate 13. The plurality of ribs 17 are steel plates having a substantially triangular shape and are disposed at a predetermined interval in a circumferential direction of the annular plate 13.

The foundation bolt 15 is installed to have a lower end 15a side buried in the inner peripheral side concrete C1 and an upper end 15b side protruding upward from the inner peripheral side concrete C1. Further, the plurality of foundation bolts 15 is disposed at a predetermined interval in the circumferential direction of the tube-shaped structure 2.

In addition, the upper end 15b sides of the foundation bolts 15 are inserted into the through holes 13c of the annular plate 13 and the foundation bolts 15 are screwed with nuts 15c such that the annular plate 13 is affixed to the inner peripheral side concrete.

The tube-shaped plate 12 is provided with a plurality of through holes 12c that have the anchor bolts 16 penetrating therethrough in a radial direction so as to be inserted thereinto and are disposed at a predetermined interval in a circumferential direction.

The anchor bolt 16 is installed to have a radial outer end 16a side buried in the outer peripheral side concrete C2 and a radial inner end 16b side protruding to the inner side of the intermediate tube-shaped steel plate 5. Meanwhile, through holes 5c into which the anchor bolts 16 are inserted are formed in the intermediate tube-shaped steel plate 5.

Further, the plurality of anchor bolts 16 is disposed at a predetermined interval in a circumferential direction and a vertical direction.

In addition, the anchor bolts 16 are mounted to have the radial inner end 16b sides inserted into the through holes 12c of the tube-shaped plate 12 and are screwed with the nuts 16c such that the tube-shaped plate 12 is affixed to the outer peripheral side concrete.

Further, a filler 18, such as a grout, a shim, and the like, is filled between the tube-shaped plate 12 and the intermediate tube-shaped steel plate 5. The filler 18 is disposed to adjust the radial position of the support 14 by adjusting the interval between the tube-shaped plate 12 and the intermediate tube-shaped steel plate 5.

Next, a construction method of the foregoing nuclear reactor vessel support structure 1 will be described with reference to the drawings.

(Tube-Shaped Steel Plate Installing Process)

First, the inner peripheral tube-shaped steel plate 4, the intermediate tube-shaped steel plate 5, and the outer peripheral tube-shaped steel plate 6 are installed at a predetermined interval from one another in a radial direction.

(First Concrete Pouring Process)

Next, the concrete is poured between the inner peripheral tube-shaped steel plate 4 and the intermediate tube-shaped steel plate 5 and between the intermediate tube-shaped steel plate 5 and the outer peripheral tube-shaped steel plate 6 to a lower height than a position at which the support 14, the foundation bolts 15, and the anchor bolts 16 are installed.

(Support Installing Process)

Next, the support 14 is installed at a predetermined position along with the foundation bolts 15 and the anchor bolt 16 to adjust the position. In this case, the support 14 is temporarily fastened if necessary.

(Second Concrete Pouring Process)

Next, the concrete is poured between the inner peripheral tube-shaped steel plate 4 and the intermediate tube-shaped steel plate 5 and between the intermediate tube-shaped steel plate 5 and the outer peripheral tube-shaped steel plate 6, and the foundation bolts 15 and the anchor bolts 16 are buried in the concrete.

After the concrete is cured, the filler 18 is filled between the tube-shaped plate 12 and the intermediate tube-shaped steel plate 5 to adjust the radial position of the support 14.

The support 14 is affixed to the tube-shaped structure 2 by the foregoing method.

Next, an effect of the foregoing nuclear reactor vessel support structure 1 will be described with reference to the drawings.

In accordance with the nuclear reactor vessel support structure 1 according to the first embodiment, the support 14 is affixed to the inner peripheral side concrete C1 by the foundation bolts 15 and is affixed to the inner peripheral side tube-shaped steel plate 4 by the anchor bolts 16. Therefore, the support 14 can resist the out-of-plane bending load applied thereto with the foundation bolts 15 and the support 14 can resist the shearing load applied thereto with the anchor bolts 16. Further, the support 14 and the tube-shaped structure 2 can be integrated without welding. Therefore, it is possible to prevent thermal distortion (deformation) due to welding and to prevent the support 14 and the tube-shaped structure 2 from being deformed at the bonded portion thereof.

In addition, the radial position of the support 14 for the tube-shaped structure 2 can be adjusted by the filler 18 filled between the tube-shaped plate 12 and the intermediate tube-shaped steel plate 5.

Further, the support 14 can resist the shearing load applied thereto with the rib 17 formed on the lower surface 13a of the annular plate 13.

Next, other embodiments will be described with reference to the accompanying drawings, but the same or similar members and portions from the foregoing first embodiment will be denoted by the same reference numerals, the description thereof will be omitted, and only components different from the first embodiment will be described.

Second Embodiment

Figure 4:
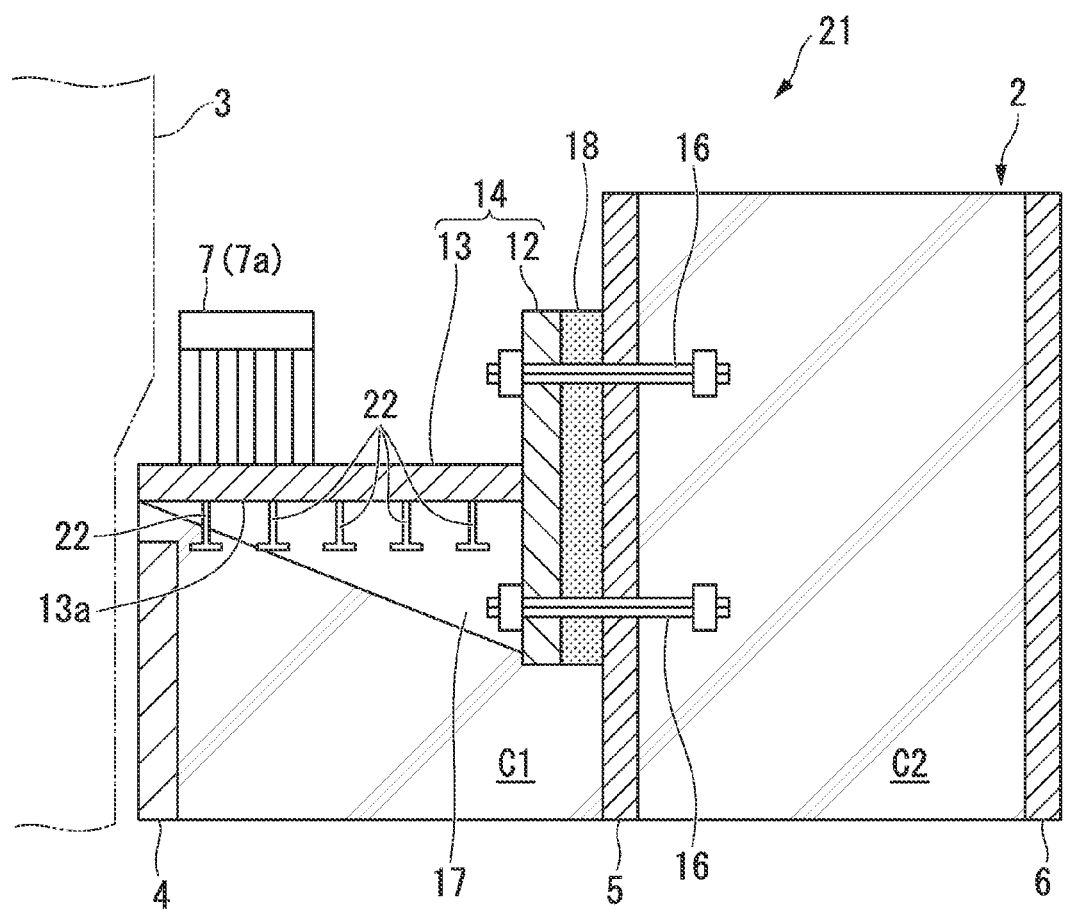
FIG. 4 is a view illustrating an example of a nuclear reactor vessel support structure according to a second embodiment of the present invention.

As shown in FIG. 4, a nuclear reactor vessel support structure 21 according to a second embodiment includes a plurality of studs (first studs, first bar members) 22 which are installed on the lower surface 13a of the annular plate 13, instead of the foundation bolt 15 (see FIG. 3) in the first embodiment.

The studs 22 are installed on the whole lower surface of the annular plate 13. The studs 22 may be attached when the support 14 is manufactured in advance. Therefore, a work load on site may be reduced.

In accordance with the nuclear reactor vessel support structure 21 according to the second embodiment, the support 14 can resist the out-of-plane bending load applied thereto with the studs 22. Therefore, the same effect as the first embodiment can be obtained. Further, the studs 22 are evenly installed on the whole lower surface 13a of the annular plate 13. Therefore, the load applied to the annular plate 13 can be dispersed throughout the inner peripheral side concrete C1.

Third Embodiment

Figure 5:
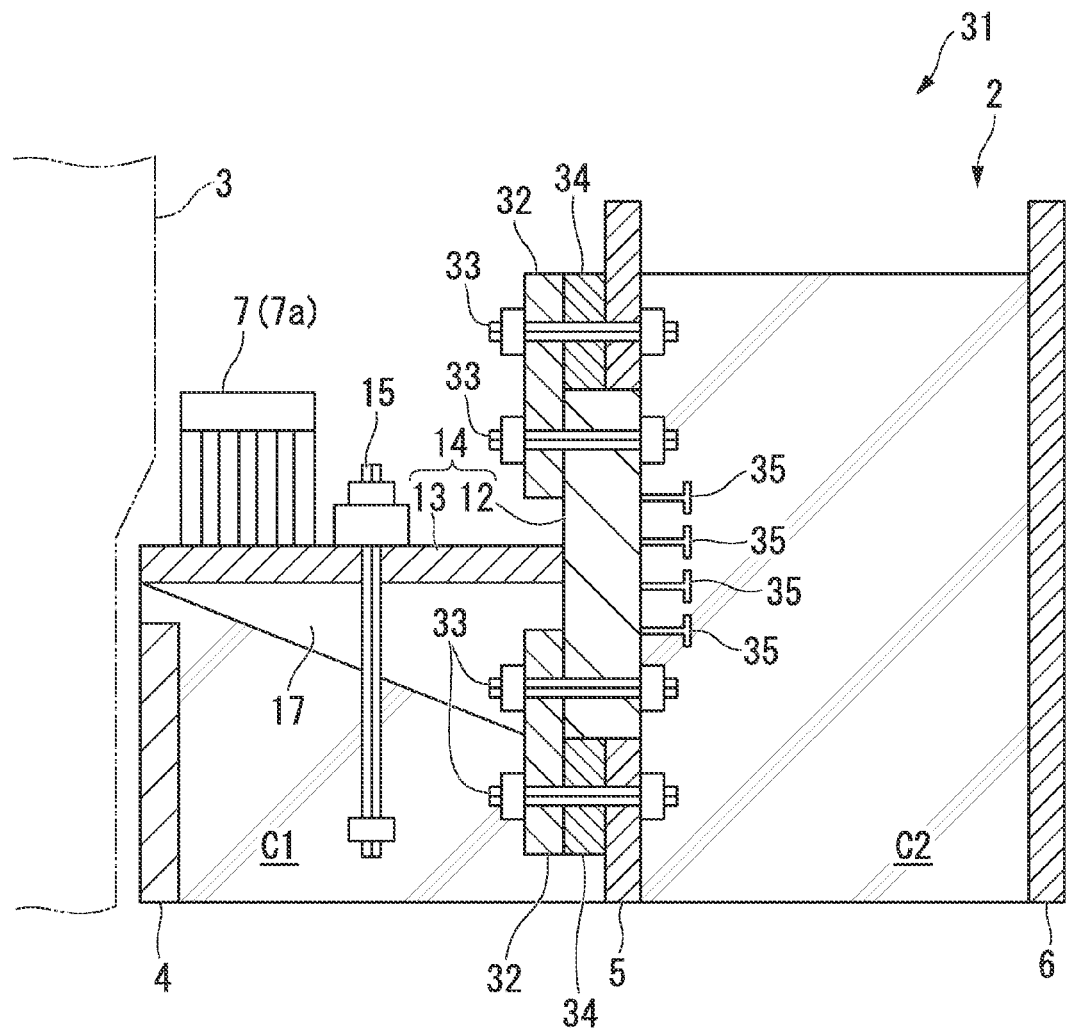
FIG. 5 is a view illustrating an example of a nuclear reactor vessel support structure according to a third embodiment of the present invention.

As shown in FIG. 5, a nuclear reactor vessel support structure 31 according to a third embodiment includes high strength bolts (second bar members) 33 that bond the tube-shaped plate 12 to the intermediate tube-shaped steel plate 5 through a splice plate 32, instead of the anchor bolts 16 (see FIG. 3) according to the first embodiment.

In the present embodiment, the intermediate tube-shaped steel plate 5 is divided in a vertical direction and the tube-shaped plate 12 is disposed between the intermediate tube-shaped steel plates 5 which are divided vertically.

Further, in the upper and lower sides of the tube-shaped plate 12, the splice plate 32 is disposed over both the tube-shaped plate 12 and the intermediate tube-shaped steel plate 5. The tube-shaped plate 12 and the splice plate 32 are affixed to each other by the high strength bolts 33, and the intermediate tube-shaped steel plate 5 and the splice plate 32 are affixed to each other by the high strength bolts 33.

In the present embodiment, the tube-shaped plate 12 is formed of a thicker steel plate than the intermediate tube-shaped steel plate 5. Therefore, a shim 34 for adjusting the thickness is installed between the intermediate tube-shaped steel plate 5 and the splice plate 32. Additionally, when the tube-shaped plate 12 is a thinner steel plate than the intermediate tube-shaped steel plate 5, the shim 34 may be installed between the tube-shaped plate 12 and the splice plate 32.

Further, a stud (second stud) 35 has one end bonded to the outer peripheral side of the tube-shaped plate 12 and the other end buried in the outer peripheral side concrete C2.

In accordance with the nuclear reactor vessel support structure 31 according to the third embodiment, the tube-shaped plate 12 and the intermediate tube-shaped steel plate 5 can be integrated through the splice plate 32 by the high strength bolts 33. Therefore, the same effect as the first embodiment is obtained.

Further, the stud 35 has one end bonded to the outer peripheral side of the tube-shaped plate 12 and the other end buried in the outer peripheral side concrete C2. Therefore, the support 14 can resist the shearing load applied thereto with the stud.

Further, the position of the support 14 for the tube-shaped structure 2 can be adjusted by adjusting the thickness of the shim 34.

Fourth Embodiment

Figure 6:
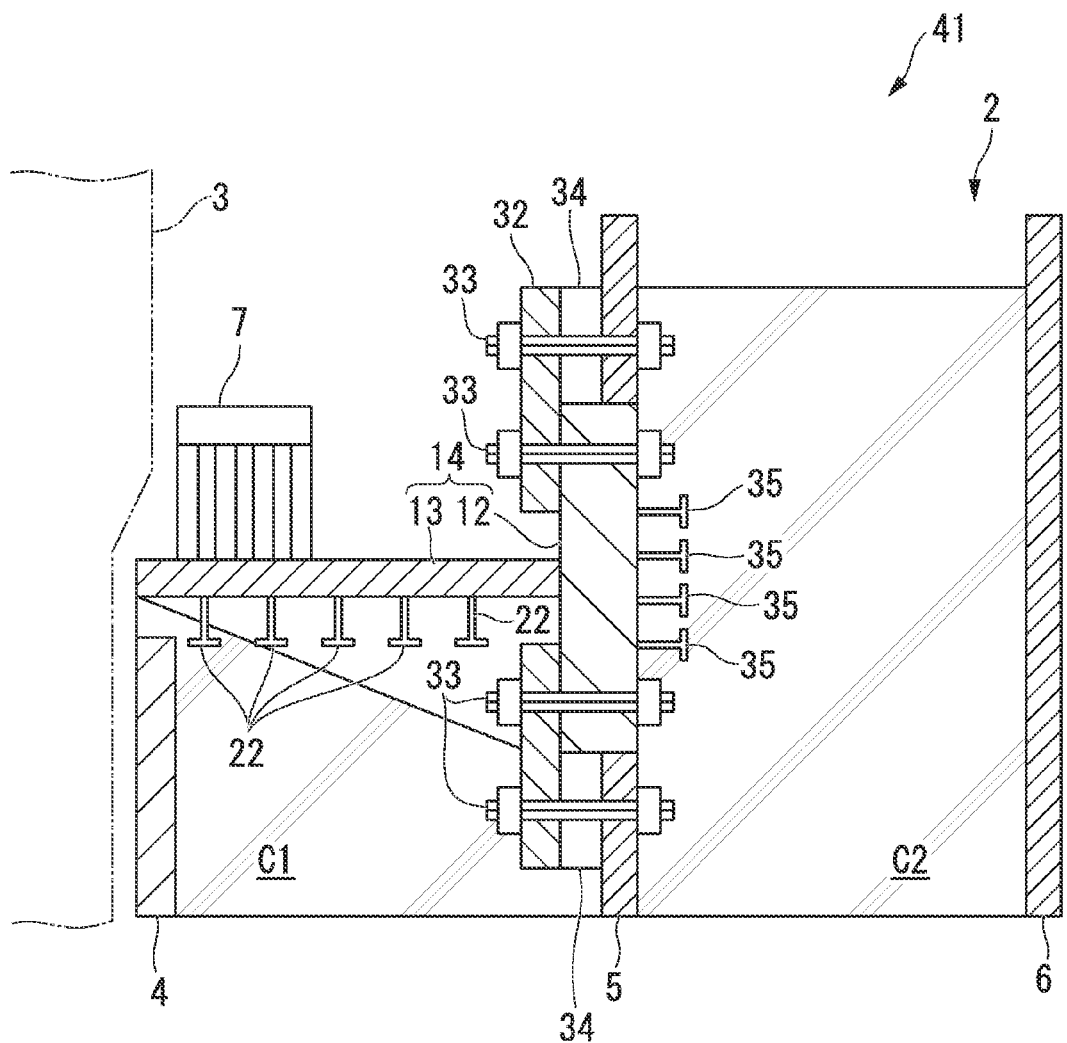
FIG. 6 is a view illustrating an example of a nuclear reactor vessel support structure according to a fourth embodiment of the present invention.

As shown in FIG. 6, a nuclear reactor vessel support structure 41 according to a fourth embodiment includes the studs (first studs, first bar members) 22 which are installed on the lower surface 13a of the annular plate 13 as in the second embodiment, instead of the foundation bolt 15 (see FIG. 4) according to the third embodiment.

In accordance with the nuclear reactor vessel support structure 41 according to the fourth embodiment, the same effect as the third embodiment is obtained.

Fifth Embodiment

Figure 7:
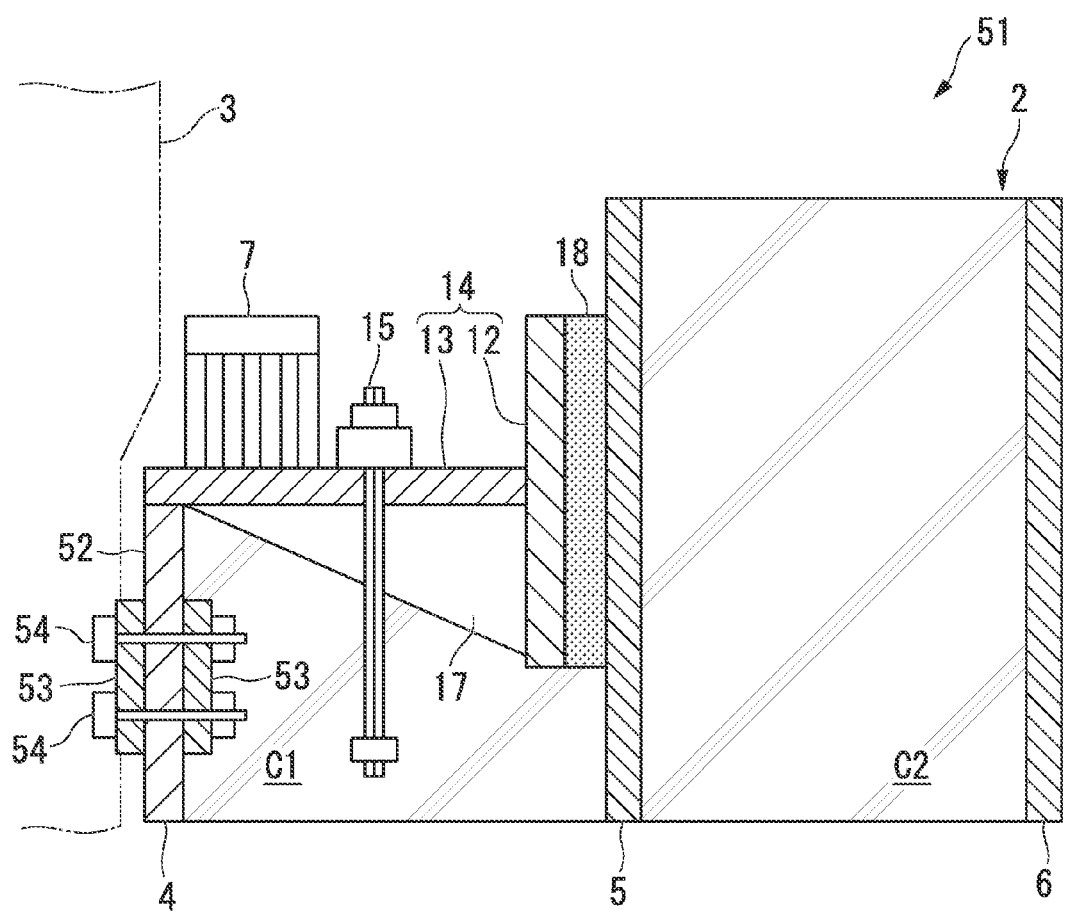
FIG. 7 is a view illustrating an example of a nuclear reactor vessel support structure according to a fifth embodiment of the present invention.

As shown in FIG. 7, a nuclear reactor vessel support structure 51 according to a fifth embodiment includes a second tube-shaped plate 52 which is bonded to the inner peripheral side of the annular plate 13 so as to protrude downward therefrom. Further, the second tube-shaped plate 52 is disposed on the upper portion of the inner peripheral tube-shaped steel plate 4 and is bonded to the inner peripheral tube-shaped steel plate 4 through a splice plate 53 disposed over the second tube-shaped plate 52 and the inner peripheral side tube-shaped steel 4 by high strength bolts (second bar members) 54.

Additionally, in FIG. 7, the splice plate 53 is disposed at both the second tube-shaped plate 52 and the inner peripheral tube-shaped steel plate 4, but may be disposed at one side thereof (the side on which nuts are fastened).

The second tube-shaped plate 52 is welded to the annular plate 13 in advance by, for example, welding, and the like.

Further, the tube-shaped plate 12 is disposed on the inner peripheral side of the intermediate tube-shaped steel plate 5 and the filler 18 is filled between the tube-shaped plate 12 and the intermediate tube-shaped steel plate 5. The radial position of the support 14 is adjusted by the filler 18.

In accordance with the nuclear reactor vessel support structure 51 according to the fifth embodiment, the second tube-shaped plate 52 is affixed to the inner peripheral tube-shaped steel plate 4 by the high strength bolts 54 and the support 14 can resist the shearing load applied thereto with the high strength bolts 54. Therefore, the same effect as the first embodiment is obtained.

Sixth Embodiment

Figure 8:
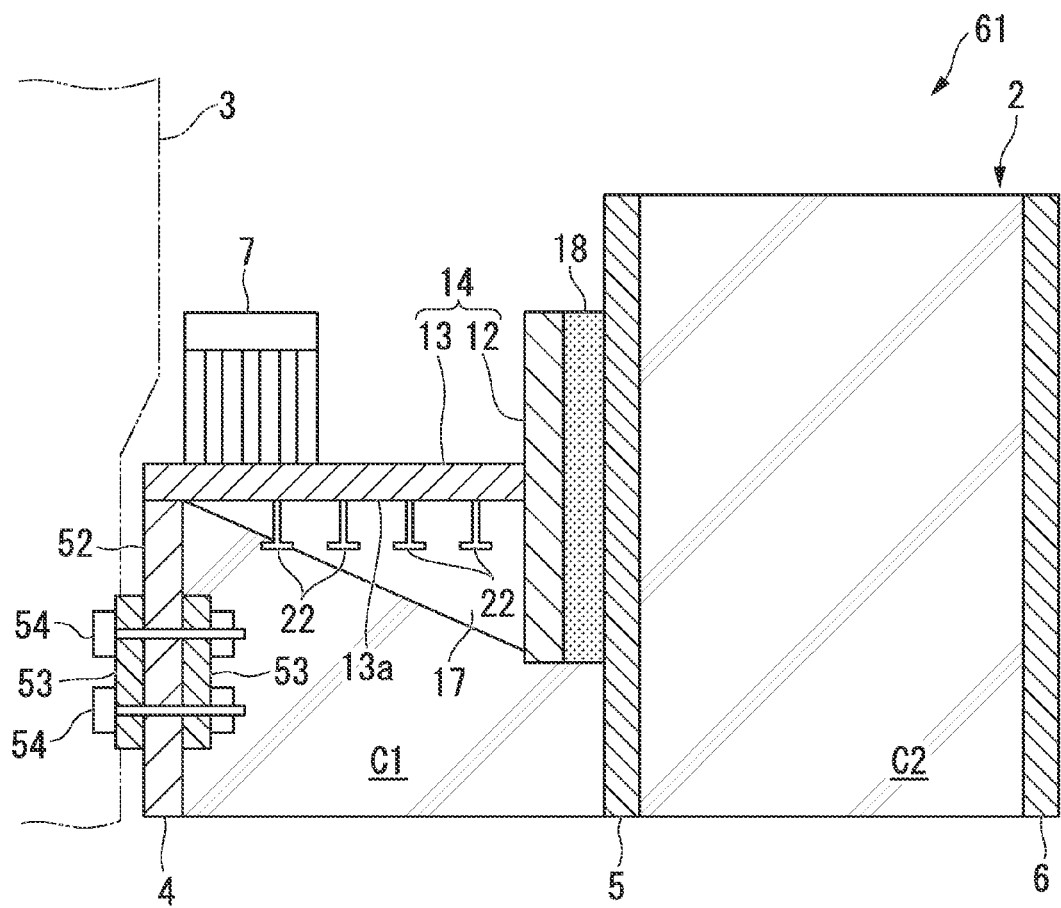
FIG. 8 is a view illustrating an example of a nuclear reactor vessel support structure according to a sixth embodiment of the present invention.

As shown in FIG. 8, a nuclear reactor vessel support structure 61 according to the sixth embodiment includes the studs (first studs, first bar members) 22 which are installed on the lower surface 13a of the annular plate 13 as in the second embodiment, instead of the foundation bolt 15 (see FIG. 7) according to the fifth embodiment.

According to a nuclear reactor vessel support structure 61 according to the sixth embodiment, the same effect as the fifth embodiment is obtained.

The support structure of the nuclear reactor vessel support structure according to the present invention has been described above, but the present invention is not limited to the foregoing embodiments and may be changed without departing from the scope of the present invention.

For example, in the foregoing embodiments, the rib 17 is formed on the lower surface 13a of the annular plate 13. However, a configuration that does not include the rib 17 may be allowed.

Further, in the foregoing fifth and sixth embodiments, the tube-shaped plate 12 is not affixed to the intermediate tube-shaped steel plate 5. However, as in the first embodiment, the tube-shaped plate 12 may be affixed to the intermediate tube-shaped steel plate 5 by the anchor bolts 16.

Further, in the foregoing embodiments, the high strength bolts 33 and 54 are used. However, bolts other than the high strength bolts 33 and 54 may be used.

Further, in the foregoing embodiments, the rib 17 is configured of the steel plate having a substantially triangular shape. However, the rib may be formed in other shapes.

INDUSTRIAL APPLICABILITY

According to the present invention, the support is affixed to the concrete placed between the inner peripheral tube-shaped steel plate and the intermediate tube-shaped steel plate by the first bar member extending in a vertical direction. In addition, the support is affixed to the inner peripheral tube-shaped steel plate or the intermediate tube-shaped steel plate by the second bar member extending in a radial direction of the tube-shaped structure. Therefore, the support can resist the out-of-plane bending load applied thereto with the first bar member. Further, the support can resist the shearing load applied thereto with the second bar member. The support can be bonded to the tube-shaped structure without the welding. Thermal distortion (deformation) due to welding does not occur. Therefore, it is possible to prevent the support and the tube-shaped structure from being deformed at the bonded portion thereof.

REFERENCE SIGNS LIST

1, 21, 31, 41, 51, 61: nuclear reactor vessel support structure
2: tube-shaped structure
3: nuclear reactor vessel
4: inner peripheral tube-shaped steel plate
5: intermediate tube-shaped steel plate
6: outer peripheral tube-shaped steel plate
7: radial support (connection part)
12: tube-shaped plate
13: annular plate
13a: lower surface
14: support
15: foundation bolt (first bar member)
16: anchor bolt (second bar member)
17: rib
18: filler
22: stud (first stud, first bar member)
32, 53: splice plate
33, 54: high strength bolt (second bar member)
34: shim
35: stud (second stud)
52: second tube-shaped plate

What is claimed is:

1. A nuclear reactor vessel support structure which comprises an inner peripheral tube-shaped steel plate, an outer peripheral tube-shaped steel plate, and an intermediate tube-shaped steel plate disposed between the inner and outer peripheral tube-shaped steel plates and is configured to support a nuclear reactor vessel on the inner peripheral side of a cylindrical structure, wherein a space between the inner peripheral tube-shaped steel plate and the intermediate tube-shaped steel plate and a space between the intermediate tube-shaped steel plate and the outer peripheral tube-shaped steel plate are filled with concrete without a gap, the nuclear reactor vessel support structure comprising:

a support member which has a tube-shaped member in which at least a portion of the tube-shaped member is disposed on the inner peripheral side of the intermediate tube-shaped steel plate, and an annular plate which protrudes from the inner peripheral surface of the tube-shaped member to the nuclear reactor vessel and to which a connection part connected to the nuclear reactor vessel is affixed, wherein the annular plate is affixed to the concrete filling the space between the inner peripheral tube-shaped steel plate and the intermediate tube-shaped steel plate by a first bar member extending in a vertical direction and the tube-shaped member is affixed to the inner peripheral tube-shaped steel plate or the intermediate tube-shaped steel plate by a second bar member extending in a radial direction of the cylindrical structure.

2. The nuclear reactor vessel support structure according to claim 1, wherein the first bar member is a foundation bolt of which a lower end side is buried in the concrete placed between the inner peripheral tube-shaped steel plate and the intermediate tube-shaped steel plate and an upper end side is inserted into a through hole formed in the annular plate to affix the annular plate.

3. The nuclear reactor vessel support structure according to claim 1, wherein the first bar member is a first stud which is bonded to a lower surface of the annular plate and buried in the concrete placed between the inner peripheral tube-shaped steel plate and the intermediate tube-shaped steel plate.

4. The nuclear reactor vessel support structure according to claim 1, wherein the second bar member is an anchor bolt which has a radial outer end side inserted into the through hole formed in the intermediate tube-shaped steel plate and buried in the concrete placed between the intermediate tube-shaped steel plate and the outer peripheral tube-shaped steel plate, and a radial inner end side inserted into the through hole formed in the tube-shaped member and affixes the tube-shaped member, and
a filler is filled between the intermediate tube-shaped steel plate and the tube-shaped member.

5. The nuclear reactor vessel support structure according to claim 1, wherein the intermediate tube-shaped steel plate is divided vertically into two portions which are a first portion and a second portion,
the first portion is disposed above the tube-shaped member and the second portion is disposed below the tube-shaped member, and a splice plate is disposed over the first portion, the second portion, and the intermediate tube-shaped steel plate, and
the second bar member is a bolt which connects the tube-shaped member with the splice plate and a bolt which joins the first portion and the second portion to the splice plate.

6. The nuclear reactor vessel support structure according to claim 5, further comprising: a shim being disposed between the splice plate and the tube-shaped member or the intermediate tube-shaped steel plate to adjust an interval between the splice plate and the tube-shaped member or the intermediate tube-shaped steel plate.

7. The nuclear reactor vessel support structure according to claim 5, wherein a stud member buried in the concrete placed between the inner tube-shaped steel plate and the intermediate tube-shaped steel plate is bonded to the outer peripheral surface of the tube-shaped member sandwiched by the first portion and the second portion of the intermediate tube-shaped steel plate in the vertical direction.

8. The nuclear reactor vessel support structure according to claim 1, wherein the support member includes a first tube-shaped member affixed to the intermediate tube-shaped steel plate and a second tube-shaped member that protrudes downward from the inner peripheral side of the annular plate and is disposed on the upper portion of the inner peripheral tube-shaped steel plate, and the splice plate is disposed over the second tube-shaped member and the inner peripheral tube-shaped steel plate,
the second bar member is a bolt which connects the second tube-shaped member with the splice plate and a bolt which joins the inner peripheral tube-shaped steel plate and the splice plate, and
a filler is filled between the first tube-shaped member and the intermediate tube-shaped steel plate.

9. The nuclear reactor vessel support structure of claim 1, wherein the support member includes a first tube-shaped member affixed to the intermediate tube-shaped steel plate and a second tube-shaped member that protrudes downward from the inner peripheral side of the annular plate and is disposed on the upper portion of the inner peripheral tube-shaped steel plate, and a splice plate is disposed over the second tube-shaped member and the inner peripheral tube-shaped steel plate,
the second bar member is a bolt which connects the tube-shaped bod with the splice plate, a bolt which joins the inner peripheral tube-shaped steel plate and the splice plate, and an anchor bolt which has the radial outer end side inserted into the through hole formed in the intermediate tube-shaped steel plate and buried in the concrete placed between the intermediate tube-shaped steel plate and the outer peripheral tube-shaped steel plate and the radial inner end side inserted into the through hole formed in the first tube-shaped member to affix the tube-shaped member.

10. The nuclear reactor vessel support structure according to claim 1, wherein a rib protruding downward is formed on the lower surface of the annular plate.

11. A construction method of the nuclear reactor vessel support structure according to claim 1, comprising:
a tube-shaped steel plate installing process of installing the inner peripheral tube-shaped steel plate, the outer peripheral tube-shaped steel plate, and the intermediate tube-shaped steel plate;
a first concrete pouring process of pouring a concrete in a position between the inner peripheral tube-shaped steel plate and the intermediate tube-shaped steel plate and between the outer peripheral tube-shaped steel plate and the intermediate tube-shape steel plate, to a lower height than a position at which a first bar member and a second bar member are installed;
a support installing process of installing the support member along with the first bar member and affixing the support member to the inner peripheral tube-shaped steel or the intermediate tube-shaped steel plate by the second bar member; and
a second concrete pouring process of pouring a concrete in a position at which the support member, the first bar member, and the second bar member are installed.

* * * * *